No. 782,768. PATENTED FEB. 14, 1905.
C. W. THORN.
YOKE AND HARDENED STEEL COLLAR FOR MARINE THRUST BEARINGS.
APPLICATION FILED OCT. 9, 1903.
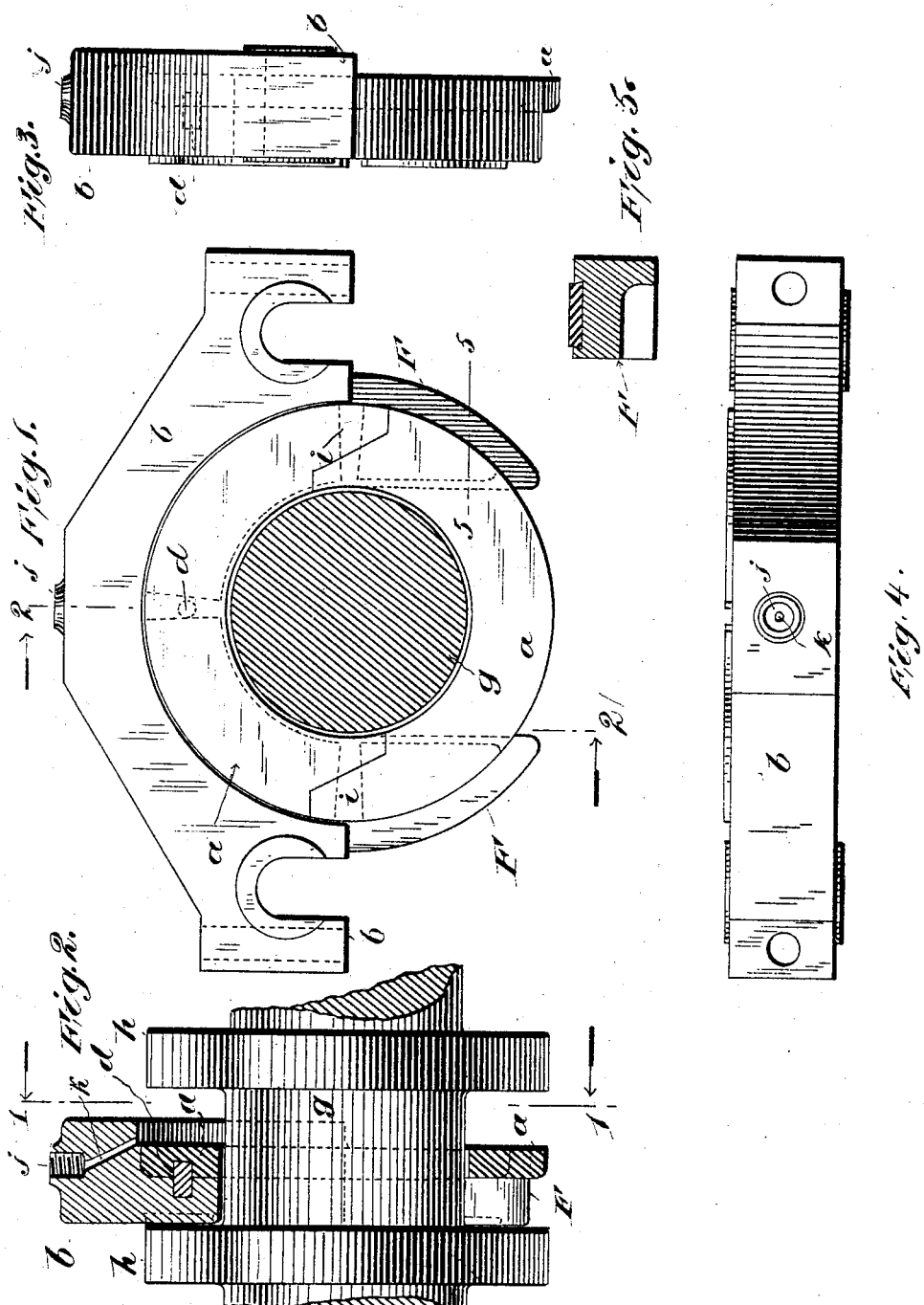

No. 782,768. Patented February 14, 1905.

UNITED STATES PATENT OFFICE.

CHESSMAN W. THORN, OF GREENPORT, NEW YORK.

YOKE AND HARDENED-STEEL COLLAR FOR MARINE THRUST-BEARINGS.

SPECIFICATION forming part of Letters Patent No. 782,768, dated February 14, 1905.

Application filed October 9, 1903. Serial No. 176,339.

*To all whom it may concern:*

Be it known that I, CHESSMAN W. THORN, a citizen of the United States, and a resident of Greenport, county of Suffolk, State of New York, have invented certain new and useful Improvements in Yokes and Hardened-Steel Collars for Marine Thrust-Bearings, of which the following is a specification.

My invention relates to that class of devices known as "propeller thrust-bearings" for steam vessels of all descriptions and by which the thrust of the propeller-shaft is received with the effect of increasing the speed of the vessel, while at the same time diminishing the friction of the bearings and the consumption of coal.

The object of my invention is to make improvements in the yoke and collar connected with such marine thrust-bearings so that the wear upon the shaft may be greatly diminished and the life of the bearing greatly increased. To this end I construct the collar of hardened steel and suspend it in a yoke of peculiar construction, as shown in the accompanying drawings, in which—

Figure 1 is a front elevation looking from aft, the shaft being in section through the line 1 1 of Fig. 2. Fig. 2 is a side elevation, the shaft being broken away and said figure being partly in section on the line 2 2 of Fig. 1. Fig. 3 is a side elevation. Fig. 4 is a top plan view, and Fig. 5 is a sectional detail on the line 5 5 of Fig. 1.

Same letters indicate similar parts in the different figures of the drawings.

The thrust-shaft $g$ (shown broken off in Fig. 2) is mounted in the usual bearings, which are not shown, and carries the usual number of shaft-collars, two of which are shown in Fig. 2 as $h\ h$. Between the shaft-collars are arranged, one in juxtaposition to each shaft-collar, the thrust-bearings to which my invention relates.

I have not considered it necessary to show the thrusting-base, which is of usual construction, but for sake of clearness have confined my illustrations to the yoke and collar, which constitute my improvement, it being understood that my improved yoke and collar are intended to be applied to any of the well-known forms of propeller roller thrust-bearings.

The yoke $b$ is intended to be held by the usual fore-and-aft holding-bolts in the usual manner and has its aft face recessed to receive the sectional collar $a\ a$, which is of hardened steel and is made in two sections jointed together along the lines $i\ i$ by bolts (not shown) or otherwise, if desired. The lower part of the yoke $b$ is equipped with flanges F F, which extend down far enough and curve inwardly toward each other sufficiently to serve as a support for the collar $a\ a$, so as to take its weight off from the shaft $g$ and hold it clear from the shaft at all times. By reason of this construction the wear of the shaft under the collar usually caused by the weight of the collar is entirely done away with and at the same time the yoke is greatly strengthened by said flanges.

The dowel-pin $d$ is provided on the yoke $b$ and passes into the collar $a$, as shown in Figs. 2 and 3, and is designed to prevent the collar from turning around the shaft $g$. If the collar were free to turn, it would if turned sufficiently bring either of the joints $i$ into an unsupported position below the shaft, where the joint might possibly work loose.

The yoke is provided with the usual oil-hole $j$ and drip-channel $k$, leading to the collar.

It will be readily understood that the thrust-bearing of which the above yoke and collar form a part can receive the thrust of the propeller-shaft without any of the tendency to have the shaft wear under the collar $a$, usual in such bearings, and that the yoke and collar thus formed will possess great strength and durability.

I claim—

1. A marine thrust-bearing comprising a yoke provided with curved flanges extending to the bottom thereof, and a sectional hardened-steel collar mounted in a recess in said yoke, said collar being adapted to receive a shaft, and said flanges serving to support said collar clear from the shaft turning therein.

2. A marine thrust-bearing comprising a yoke provided with curved flanges extending to the bottom thereof, and a sectional hardened-steel collar mounted in a recess in said yoke, said collar being adapted to receive a shaft, and said flanges serving to support said collar clear from the shaft turning therein, and means preventing the collar from turning with the shaft.

CHESSMAN W. THORN.

Witnesses:
FRED H. PELL,
THOS. N. WILKINS.